UNITED STATES PATENT OFFICE.

HEINRICH COLLOSEUS, OF BERLIN, GERMANY, ASSIGNOR, BY MESNE ASSIGNMENTS, TO COLLOSEUS CEMENT COMPANY, A CORPORATION OF NEW JERSEY.

PROCESS OF MANUFACTURING CEMENT BY TREATING HOT LIQUID BLAST-FURNACE SLAG WITH MILK OF LIME.

No. 893,708. Specification of Letters Patent. Patented July 21, 1908.

Application filed May 17, 1907. Serial No. 374,246.

*To all whom it may concern:*

Be it known that I, HEINRICH COLLOSEUS, a chemist and a doctor of philosophy, a subject of the German Emperor, and a resident of 15 Spichernstrasse, in the city of Berlin, Kingdom of Prussia, and German Empire, have invented a certain new and useful Process of Manufacturing Cement by Treating Hot Liquid Blast-Furnace Slag with Milk of Lime, of which the following is a specification.

This invention has reference to a process for manufacturing cement from blast furnace slag.

In British Patent 18623 of 1903 a process has been described, according to which hot liquid blast furnace slag is allowed to flow into milk of lime. The slag clinkers thereby obtained contain from 30 to 40 per cent. of water, which is combined either chemically or partly mechanically. For utilizing these slag granules in the manufacture of cement, it is necessary to submit them to a very expensive drying and grinding process. As has been stated in the patent referred to, no chemical combination is formed in that process between slag and lime; the lime is contained in the free state in the slag clinkers thus obtained, which are of glass like structure.

The inconveniences which the manufacture of cement according to the process of the patent referred to, presents, are avoided in my invention by the fact, that milk of lime, that is to say a mixture of slaked lime with water in the perfectly liquid state, is injected into the hot liquid slag, and in particular blast furnace slag, in suitable proportions. The milk of lime is introduced in the following manner in accordance with the percentage of the various constituents of the blast furnace slag; in the case of slags very rich in lime, containing from, say, 45 to 50% CaO a milk of lime, containing 1 to 2 per cent. of lime and in the case of slags containing, say, from 40 to 45 per cent. CaO, a milk of lime with from 2 to 5 per cent. of lime is used for injection. Even in the case of slags with less than 40 per cent. of lime cement can be obtained by injecting a milk of lime containing up to 10 per cent. of lime.

Inasmuch as the slaked lime is soluble in water to a slight extent, the amount of dissolved lime contained in the milk of lime, is capable of entering into a chemical combination with the silicic acid and with the alumina, while the undissolved free lime which is in suspension in the milk of lime is distributed in finely divided condition in the slag. The quantities of water contained in the milk of lime which is injected into the slag, are immediately vaporized by the hot slag, so that the resulting product is perfectly anhydrous and does not require any further drying.

While the product obtained according to the British Patent 18623 of 1903 referred to, is made up of glassy, strongly hydrated granules, the process forming the subject of this invention, forms a product which is similar to tuff stone and which does not contain the slightest trace of water, but which is at once ready to be ground into Portland cement. My process is also distinguished from other previous processes of treating slag for the manufacture of cement. In another of these processes, water is sprinkled in a closed container upon slag in hot liquid condition. In the process referred to, the action is merely a physical change, that is to say a disintegration of the slag without any further addition. In another process for the manufacture of Portland cement from slag, the liquid blast furnace slag is allowed to run into containers, where it is mixed with the lime to make up any deficiency in lime of the slag, the lime being thought in the previous process referred to, as being of special importance. The thus obtained, intimately mixed and still liquid mass is then granulated by means of water or by means of milk of lime. In another process, which is described in United States Patent 397373, lime, alumina and other ingredients are added to the slag in the dry state, in order to obtain a composition similar to that of Portland cement, the additions being injected in the dry state in said previous process, taking care not to allow the temperature of the slag to be reduced, a chemical reaction being assumed to take place between the injected dry substances and the slag; then the liquid mixture of blast furnace slag and injected materials is granulated in water or water is sprinkled on it, and it is then dried, to be worked up into cement. The two last mentioned processes are therefore distinguished by the fact, that they necessitate a rather large addition of lime, in order to convert blast furnace slag into cement. From the processes referred to and taking into account the composition of the slag, it appears, that the deficiency of lime ascertained by an analysis of the slag, is supplied by adding a corresponding percentage of lime in the dry state, in order to obtain a product, which as regards lime, has the same chemical composition as Portland cement, that is to say, which according to the previous processes referred to, contains about 62 per cent. of lime. In accordance with this invention however, only a comparatively small percentage of lime is added to the blast furnace slag, that is to say in the case of slags with a maximum percentage of for instance, from 45 to 50 per cent. of CaO only 2 per cent. of lime are added, partly in the dissolved state and partly held in suspension in water.

What I claim and desire to secure by Letters Patent of the United States is:—

1. In the manufacture of hydraulic cement from slag by the use of milk of lime, the employment for treating a slag having from 50 to 45 per cent. of lime, of milk of lime in sufficient quantity to add 1 or 2 per cent. of lime to the disintegrated slag, substantially as described.

2. In the manufacture of hydraulic cement from slag by the use of milk of lime, the employment of the said milk of lime in such a quantity that it adds from 2.5 per cent. of lime to the slag, when the lime-content of the latter is from 45 to 40 per cent., substantially as described.

3. In the manufacture of hydraulic cement from slag by the use of milk of lime, the employment of the said milk of lime in such a quantity that it adds from 10 per cent. of lime to the slag, when the lime-content of the latter is below 40 per cent., substantially as described.

In witness whereof I have hereunto signed my name this 2nd day of May 1907 in the presence of two subscribing witnesses.

HEINRICH COLLOSEUS.

Witnesses:
 WOLDEMAR HAUPT,
 HENRY HASPER.